United States Patent
Scheidt et al.

(10) Patent No.: US 9,919,332 B2
(45) Date of Patent: Mar. 20, 2018

(54) DEVICE AND METHOD FOR APPLYING A REACTIVE MIXTURE COMPRISED OF AT LEAST TWO COMPONENTS TO A SUBSTRATE

(71) Applicant: KRAUSSMAFFEI TECHNOLOGIES GMBH, München (DE)

(72) Inventors: Ernst Scheidt, Dachau (DE); Josef Renkl, Markt Indersdorf (DE)

(73) Assignee: KraussMaffei Technologies GmbH, München (DE)

( * ) Notice: Subject to any disclaimer, the term of this patent is extended or adjusted under 35 U.S.C. 154(b) by 625 days.

(21) Appl. No.: 14/385,704

(22) PCT Filed: Mar. 21, 2013

(86) PCT No.: PCT/EP2013/055876
§ 371 (c)(1),
(2) Date: Sep. 16, 2014

(87) PCT Pub. No.: WO2013/143956
PCT Pub. Date: Oct. 3, 2013

(65) Prior Publication Data
US 2015/0064356 A1  Mar. 5, 2015

(30) Foreign Application Priority Data
Mar. 27, 2012 (DE) .................. 10 2012 006 048

(51) Int. Cl.
*B05B 15/08* (2006.01)
*B29B 7/74* (2006.01)
(Continued)

(52) U.S. Cl.
CPC ................ *B05B 15/08* (2013.01); *B05B 1/02* (2013.01); *B05B 1/04* (2013.01); *B05D 1/02* (2013.01);
(Continued)

(58) Field of Classification Search
None
See application file for complete search history.

(56) References Cited

U.S. PATENT DOCUMENTS

| 3,801,009 A | 4/1974 | Marshall, III |
| 2002/0071907 A1 | 6/2002 | Vodermayer et al. |

(Continued)

FOREIGN PATENT DOCUMENTS

| BE | 787 075 | 12/1972 |
| CN | 1726118 | 1/2006 |

(Continued)

OTHER PUBLICATIONS

Chinese Search Report dated Feb. 2, 2016 in corresponding Chinese Patent Application No. 201380015143.3.

(Continued)

*Primary Examiner* — Nathan T Leong
(74) *Attorney, Agent, or Firm* — Henry M. Feiereisen LLC

(57) ABSTRACT

A device and method for applying a reactive mixture comprised of at least two components to a substrate (41) having a spraying device (10) capable of generating a planar, fan-shaped spray jet (18) and a round spray jet (17), and having a means for moving the spraying device relative to the substrate, wherein the spraying device is moved over the substrate in at least two stages, wherein in the first stage, a first application of material (42) is performed with reactive mixture, using the planar, fan-shaped spray jet, on the substrate, and in a further stage a second application of material (43*a-c*) is subsequently performed with reactive mixture, using the round spray jet, on at least a section of the material applied to the substrate in the first application of material.

7 Claims, 1 Drawing Sheet

(51) Int. Cl.
*B29B 7/90* (2006.01)
*B29B 15/10* (2006.01)
*B29C 67/24* (2006.01)
*B29C 70/30* (2006.01)
*B05B 1/02* (2006.01)
*B05B 1/04* (2006.01)
*B05D 1/02* (2006.01)

(52) U.S. Cl.
CPC .............. *B29B 7/7438* (2013.01); *B29B 7/90* (2013.01); *B29B 15/10* (2013.01); *B29C 67/246* (2013.01); *B29C 70/305* (2013.01); *Y10S 901/43* (2013.01)

(56) References Cited

U.S. PATENT DOCUMENTS

| | | |
|---|---|---|
| 2003/0017335 A1 | 1/2003 | Cermignani |
| 2004/0222310 A1 | 11/2004 | Dontatti |
| 2006/0145380 A1 | 7/2006 | Renkl et al. |
| 2008/0061168 A1 | 3/2008 | Scheidt |
| 2008/0142620 A1 | 6/2008 | Scheidt et al. |
| 2011/0042842 A1 | 2/2011 | Renkl et al. |
| 2013/0087636 A1 | 4/2013 | Scheidt |

FOREIGN PATENT DOCUMENTS

| | | |
|---|---|---|
| CN | 1946542 | 4/2007 |
| CN | 102039234 | 5/2011 |
| DE | 103 20 341 | 6/2004 |
| DE | 102004021544 | 12/2007 |
| DE | 102009007703 | 10/2009 |
| EP | 2 163 368 | 3/2010 |
| EP | 2345530 | 7/2011 |

OTHER PUBLICATIONS

International Search Report issued by the European Patent Office in International Application PCT/EP2013/055876 dated Mar. 21, 2013.

DEVICE AND METHOD FOR APPLYING A REACTIVE MIXTURE COMPRISED OF AT LEAST TWO COMPONENTS TO A SUBSTRATE

CROSS-REFERENCES TO RELATED APPLICATIONS

This application is the U.S. National Stage of International Application No. PCT/EP2013/055876, filed Mar. 21, 2013, which designated the United States and has been published as International Publication No. WO 2013/143956 and which claims the priority of German Patent Application, Serial No. 10 2012 006 048.3, filed Mar. 27, 2012, pursuant to 35 U.S.C. 119(a)-(d).

BACKGROUND OF THE INVENTION

The invention relates to a device and a method for applying a reactive mixture comprised of at least two components to a substrate.

In the manufacture of composite components, for example of fibre-reinforced products, it is of known art to lay fibre mats onto a workpiece onto or into a mould, and subsequently to coat them with a plastic material. In recent times such methods have become of known art, for example, under the name "Baypreg Technology". In this regard, reference is made, for example, to DE 10 2009 007 703 A1.

For the application of the plastic material, which can be, for example, a polyurethane material, spray heads are usually deployed that generate a round spray jet. In addition the possibility can be created of mixing fibres into the plastic material in order to achieve a reinforcement effect. Depending upon whether, therefore, a pure plastic application of material is desired, or an application of plastic mixed with fibres for partial reinforcement of the component to be coated, fibres can also be added during the spraying process. Here the introduction of the fibres usually occurs in the form of lateral introduction into the spray jet. Stated more precisely, a separate jet of fibres is provided, which is directed onto the plastic spray jet. The round jet nozzles usually used for the generation of the spray jet have the disadvantage that they only have a relatively small spray angle, and the spraying of parts with large surface areas leads to very long cycle times. While it is true that the spray angle can be influenced by an appropriate supply of air, this has the consequence that an increase in spray mist arises. With the generation of an increased and/or finer spray mist, however, the result is an increase in loss of material and a more severe contamination of the environment. Overall this results in higher costs and an increase in maintenance activities.

SUMMARY OF THE INVENTION

The object of the invention is therefore to create a device and a method for applying a reactive mixture comprised of at least two components to a substrate, which together avoid the above-cited disadvantages.

According to one aspect of the invention, the object is achieved by a device for applying a reactive mixture comprised of at least two components to a substrate, with a spraying device, which is able to generate a planar, fan-shaped spray jet, and an essentially round spray jet, and a means for the movement of the spraying device relative to the substrate, wherein the device is designed and adapted such that the spraying device can be moved in at least two stages over the substrate, wherein the spraying device is designed such that in the first stage a first application of material with a reactive mixture takes place with the planar, fan-shaped spray jet onto the substrate, and subsequently in a further stage a further application of material with a reactive mixture takes place with the round spray jet onto at least one section of the material applied onto the substrate in the first application of material.

According to another aspect of the invention, the object is achieved by a method for applying a reactive mixture comprised of at least two components to a substrate, wherein with a spraying device in a first step a first application of material with a reactive mixture takes place with a planar, fan-shaped spray jet onto the substrate, and subsequently in a further step a further application of material with a reactive mixture takes place with an essentially round spray jet onto a section of the material applied onto at least one substrate in the first application of material.

Advantageous developments are the subjects of the dependent claims.

In accordance with the invention the device for applying the reactive mixture comprised of at least two components is provided by a spraying device that is able to generate a planar, fan-shaped spray jet, and also an essentially round spray jet.

Here the device can be designed and adapted such that the spraying device is moved in at least two stages over the substrate, wherein for example in the first stage with the planar, fan-shaped spray jet a first application of material with a reactive mixture onto the substrate takes place, and then in a second stage with the round spray jet a further application of material with a reactive mixture takes place onto at least a section of the material applied onto the substrate in the first application of material. For this purpose the device has a means or handling unit by which relative movement between the substrate and the spraying device can be effected. Such a handling unit can be, for example, a robot, on which the spraying device is fitted. The robot then, for example, moves the spraying device over the substrate in a plurality of stages. However an arrangement would also be conceivable in which the substrate is arranged such that it can be moved, for example, on a robot and the spraying device is arranged in a fixed position. Also conceivable is a combination in which both the substrate and also the spraying device are arranged such that they can be moved. The movement of the spraying device over the substrate is therefore not only to be understood as a pure movement of the spraying device itself, but rather should comprise all configurations in which a relocation of the application region of reactive mixture on the substrate takes place.

This set-up of the device has a plurality of advantages. With the use of the planar, fan-shaped spray jet it is possible to undertake application over a large surface area with a large quantity of material. Here depending upon the type of nozzle, large spray widths of, for example, up to 800 mm, can be achieved. Furthermore the use of a planar, fan-shaped spray jet enables very accurate spraying of the substrate, as a result of which there is hardly any undesired release of spray beyond the region that is to be coated. Moreover a large surface area of the substrate can be sprayed in a very short time. For most components in the first stage just a single traverse of the substrate will be sufficient in order to spray the surface that is to be coated completely with material. In order to generate specific accumulations of material on the substrate, a round spray jet is used in the second stage. By this means it is possible to provide more material in accurately defined regions of the component for partial reinforcement. Overall, therefore, as a result of the provision of different types of spray jet in one spraying device a reduction of the cycle time can be achieved.

In order to generate the above types of spray jet the spraying device in a preferred form of embodiment has a first mixing head provided with a planar jet nozzle for the generation of the planar, fan-shaped spray jet, and a second mixing head provided with a round jet nozzle for the generation of the round spray jet. This arrangement has the advantage that the performance of each mixing head can be optimally adapted to the spray jet that is being generated.

Furthermore the second mixing head generating the round spray jet can be provided with a fibre feed, advantageously a fibre feed that is coaxial with the spray direction. By this means it is possible to add fibres to the round spray jet as required, as a result of which, in turn, it is possible to create local regions on the substrate that are reinforced with fibres.

It is advantageous if the device furthermore has a fibre cutting facility that is fitted to the spraying device. With such an arrangement it is possible to keep the fibre transport path between the fibre cutting facility and the second mixing head as short as possible.

The above-described device can have a special reception unit for purposes of receiving the substrate, with which an alteration of position, in particular a turning, of the substrate is possible. The reception unit can take the form, for example, of a frame, into which the substrate is clamped. This frame can then be held such that it can rotate about an axis, as a result of which a turning of the substrate, and thus spraying of both sides of the substrate, is possible. However, it is also conceivable for such a frame to be attached to a robot, which is then able to move the frame freely and also turn the latter. However, it is also possible to spray the material on one side, while in the first instance it is located on a support. In order to spray the other side, for example, a robot with needle grippers can then pick up the substrate and position it appropriately.

The inventive method for applying the reactive mixture has a first step in which a first application of material with the reactive mixture onto the substrate takes place with a spraying device with a planar, fan-shaped spray jet. Subsequently in a further step a further application with the reactive mixture takes place with the spraying device with an essentially round spray jet onto at least a section of the material applied onto the substrate in the first application. The spraying device thus allows a changeover between a planar and a round spray jet, wherein the advantages of both types of spray jets can be utilised optimally.

The sequence in which the spraying device generates the planar, fan-shaped, spray jet and the essentially round spray jet in the production process is dependent upon the type of component to be produced and can be varied as required.

In the second step fibres can be fed into the mixture, i.e. into the spray jet. Here the feed can be continuous during the spraying process, or can also be undertaken only at certain times.

The spraying device is preferably moved over the substrate. Thus it is possible, for example, with a traverse over the substrate in one direction to undertake an application of material over a large surface area using the planar spray jet and then with a traverse over the substrate in the opposite direction to undertake, using the round spray jet, a specific application of material, additionally provided with fibres as required.

Furthermore it is desirable that the second step takes place immediately following the first step so that the material applied in the first step has not yet begun to harden.

The above-described method can advantageously be used for the manufacture of a composite component. In such a method a substrate is firstly prepared. The reactive mixture is then applied with the above-described method on one side of the substrate. Subsequently the substrate can then be moved into a mould, in which the applied material then hardens. However, it is also possible for the substrate to be already prepared in a mould and to apply the reactive mixture onto the substrate located in the mould.

Moreover in the method for manufacturing the composite component it is also possible to turn the substrate after the mixture has been applied on one side of the substrate. An application of material can then also take place on the other side of the substrate using the above-described method.

A reinforcing structure is preferably used as the substrate. This can be, for example, a fibrous reinforcing structure such as a fibre mat or similar.

BRIEF DESCRIPTION OF THE DRAWING

Further advantages, features, and details of the invention ensue from the following description of a preferred example of embodiment, and also with the aid of the drawings. In the figures.

DETAILED DESCRIPTION OF PREFERRED EMBODIMENTS

Figure 1:
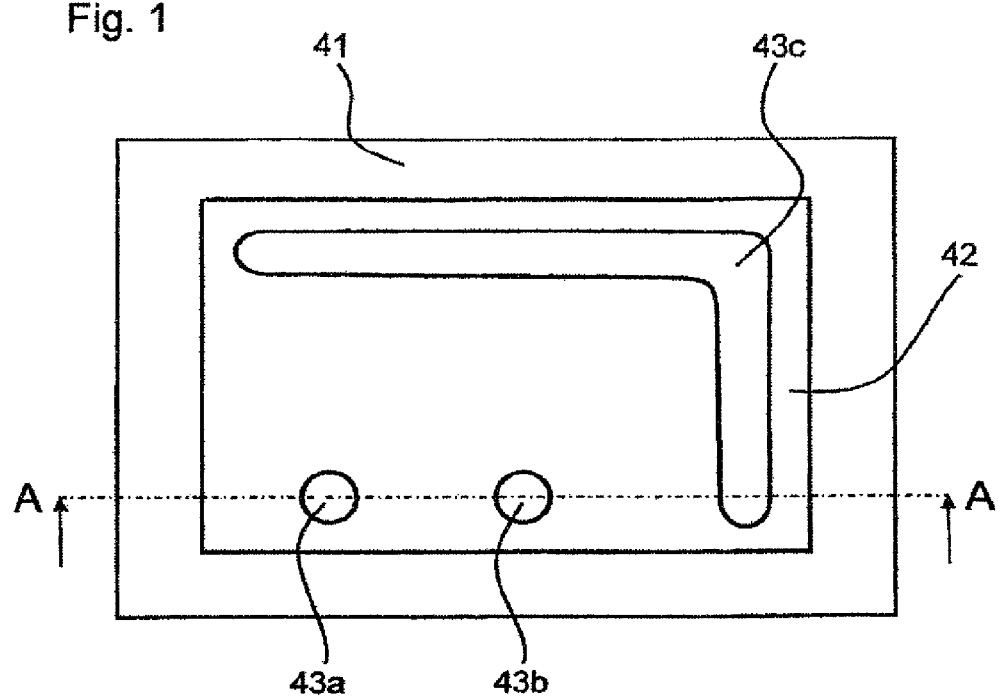
FIG. 1 shows a plan view of a substrate sprayed using the inventive method.

In the present example of embodiment the substrate 41 shown in FIG. 1 is a rectangular fibre mat. On this fibre mat 41 an essentially rectangular surface area is sprayed with a polyurethane material 42. The sprayed-on polyurethane material 42 penetrates into the fibre mat. On the surface sprayed with the polyurethane material 42 further applications of material are provided in the form of a first round application of material 43a, a second round application of material 43b, and an essentially L-shaped application of material 43c. These further applications of material also take the form of a polyurethane material, wherein in the present case the latter is blended with fibres. The fibre mat sprayed in this manner can subsequently be introduced into a mould for purposes of hardening. Before or after the hardening of the material the part of the fibre mat 41 extending beyond the region 42 is detached, so that the end result is the desired composite component.

Figure 2:
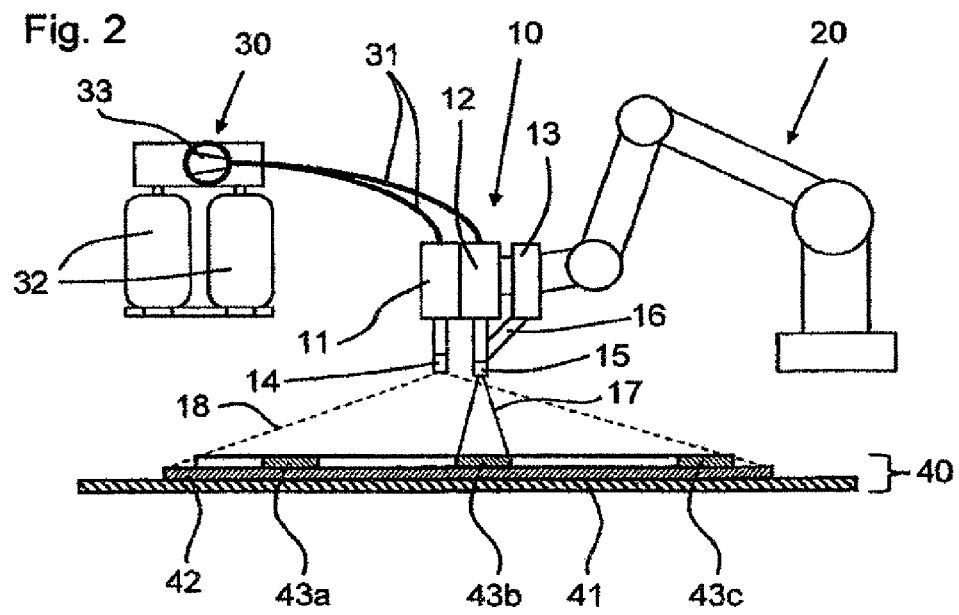
FIG. 2 shows a schematic set-up of a device for applying a reactive mixture to the substrate, wherein the structure is shown in a side view and the sprayed substrate is shown in a sectional view along the line A-A in FIG. 1.

FIG. 2 shows an inventive device for applying a reactive material to the substrate shown in FIG. 1. The device includes essentially of a robot 20, on which is attached a spraying device 10 for the application of the reactive mixture, a component feed unit 30, which stores the individual components of the reactive mixture to be generated and, supplies them to the spraying device 10, and a reception unit, not shown, which can receive the substrate. The spraying device 10 has a first mixing head 11 and a second mixing head 12. The first mixing head 11 is provided with a planar jet nozzle 14, which can generate a planar, fan-shaped spray jet 18. The second mixing head 12 is provided with a round jet nozzle 15 for purposes of generating a round spray jet 17. A fibre cutting facility 13 is arranged near the mixing head 12. The fibre cutting facility 13 is connected via a pipe 16 with the second mixing head 12. The component feed unit 30 has a plurality of containers 32 for purposes of storing the individual components of the reactive mixture to be generated, and a pump 33, which can extract the individual components from the respective containers and can apply a pressure to them. The pump 33 is connected via lines 31 with the first mixing head 11 and the second mixing head 12 and supplies the appropriate component quantities to the respective mixing heads as required.

As already stated above, FIG. 2 shows the sprayed fibre mat 41 in a section along the line A-A in FIG. 1. Here it is to be noted that this figure just serves to provide a schematic illustration of the application, i.e. the spraying on, of the plastic materials. In particular when using a fibre mat the material applied 42 will at least partially penetrate into the latter. However, this is not illustrated here.

The application of the individual material layers is configured as follows. Firstly there takes place in a first stage the application of the material 42 onto the fibre mat 41. For this purpose the spraying device 10 is moved by the robot 20 to the lower end of the fibre mat 41 as shown in FIG. 1. The component feed unit 30 then supplies the desired components in predetermined quantities to the mixing head 11, and mixing of the components takes place in the mixing head 11. From the mixing head 11 there then takes place an application of material by means of the planar jet nozzle 14, wherein the device is thereby evenly moved over the fibre mat 41. By using the planar jet nozzle 14 a large section of the fibre mat 41 can thus be sprayed with material by a simple traverse over the latter. The first application of material is then terminated, in that the component supply to the first mixing head 11 is stopped, or the mixing head 11 is brought into a state in which the components are circulated. Immediately following on from this application of material a further application of material takes place with the second mixing head 12 provided with the round jet nozzle 15. In a second stage a further application of material is now partially undertaken onto the material applied 42 in the previous stage. As can be seen from FIG. 1 one section of the second application of material 43c takes place in an L-shape, and further applications of material 43a, 43b take place in round shapes. The material used in this second stage can be a pure polyurethane mixture, or can also be a polyurethane material into which fibres have been mixed. By means of this specific second application of material areas of reinforcement can be provided on the component.

REFERENCE LIST

10 Spraying device
11 First mixing head
12 Second mixing head
13 Fibre cutting facility
14 Planar jet nozzle
15 Round jet nozzle
16 Pipe
17 Round spray jet
18 Planar, fan-shaped spray jet
20 Robot
30 Component feed
31 Lines
32 Containers
33 Pump
40 Coated substrate
41 Substrate
42 First application of material
43a Further application of material
43b Further application of material
43c Further application of material

The invention claimed is:

1. A device for applying a reactive mixture comprised of at least two components to a substrate, said device comprising:
 a spraying device configured to generate a spray jet having a shape with a spray width extending in a planar direction and an essentially round spray jet; and
 a handling unit configured to move the spraying device relative to the substrate in at least two stages over the substrate such that in a first stage the spraying device effects with the planar, fan-shaped spray jet a first application of material with a reactive mixture onto the substrate, and in a second stage the spraying device effects with the round spray jet a second application of material with a reactive mixture onto at least a section of the material applied onto the substrate in the first application of material,
 wherein the spraying device includes a first mixing head having a planar jet nozzle configured to generate the spray jet having the shape with the spray width extending in the planar direction, and a second mixing head having a round jet nozzle configured to generate the round spray jet.

2. The device of claim 1, wherein the second mixing head is provided with a coaxial fibre feed.

3. The device of claim 2, further comprising a fibre cutting facility attached to the spraying device.

4. The device of claim 1, wherein the handling unit is a robot.

5. The device of claim 1, further comprising a reception unit configured to receive the substrate and to alter a position of the substrate such that material is applicable onto both sides of the substrate.

6. The device of claim 5, wherein the reception unit is configured to turn the substrate.

7. A device for applying a reactive mixture comprised of at least two components to a substrate, said device comprising:
 a spraying device configured to generate a spray jet having a shape with a spray width up to no more than 800 mm extending in a planar direction and an essentially round spray jet; and
 a handling unit configured to move the spraying device relative to the substrate in at least two stages over the substrate such that in a first stage the spraying device effects with the planar, fan-shaped spray jet a first application of material with a reactive mixture onto the substrate, and in a second stage the spraying device effects with the round spray jet a second application of material with a reactive mixture onto at least a section of the material applied onto the substrate in the first application of material.

* * * * *